United States Patent [19]

Matsushima

[11] 3,930,566

[45] Jan. 6, 1976

[54] DEVICE FOR DRIVING A POWER WINDOW

[75] Inventor: Takeo Matsushima, Toyota, Japan

[73] Assignee: Toyota Jidosha Kogyo Kabushiki Kaisha, Tokyo, Japan

[22] Filed: Mar. 27, 1974

[21] Appl. No.: 455,360

[30] Foreign Application Priority Data

July 4, 1973 Japan .......................... 48-79365[U]

[52] U.S. Cl. .................................................... 192/8 C

[51] Int. Cl.² ............................................ B60L 1/00

[58] Field of Search .... 192/8 C, 17 D, 12 BA, 33 C

[56] References Cited

UNITED STATES PATENTS

| | | | |
|---|---|---|---|
| 1,997,646 | 4/1935 | Miller | 192/8 C |
| 2,145,666 | 1/1939 | Roethel | 192/8 C |
| 2,881,881 | 4/1959 | Sacchini et al. | 192/8 C |
| 3,235,248 | 2/1966 | Golde | 192/8 C |
| 3,361,235 | 1/1968 | Sacchini | 192/8 C |

*Primary Examiner*—Samuel Scott
*Assistant Examiner*—Wesley S. Ratliff, Jr.
*Attorney, Agent, or Firm*—Stevens, Davis, Miller & Mosher

[57] ABSTRACT

A device for preventing the reversal of a power window motor, wherein when the motor is normally actuated, a coiled spring loosely fitted on a core coupled with a worm gearing is contracted by the core, and the friction between the outer periphery of the coiled spring and the inner periphery of a drum is weakened, so that an output piece is rotated to open or close window glass, while when it is intended to manually push down or pull up the window glass, the coiled spring is expanded by a dog of the output piece, and the friction is strengthened, so that the turning of the dog is checked to brake the output piece.

4 Claims, 5 Drawing Figures

DEVICE FOR DRIVING A POWER WINDOW

BACKGROUND OF THE INVENTION

The present invention relates to a device for preventing the reversal of a power window motor, which makes it impossible to manually operate the window glass of an automobile as it is driven by the power window motor.

Prior-art means for preventing the reversal of a power window motor makes use of self-locking which is attained by suitably combining the shapes of and the friction between a worm and a worm wheel drivingly coupled with a rotor. With such reversal preventing means, however, the power window motor can become incapable of starting, so that a powerful power window motor is required. On the other hand, the reversal of the power window motor cannot be reliably prevented.

SUMMARY OF THE INVENTION

An object of the present invention is to reliably prevent a turning force in the reverse direction as is exerted on a power window motor, that is, a turning force which intends to rotate the power window motor from the window glass side, and to accomplish the reversal preventing function with a small number of components and a simple structure.

Another object of the present invention is to prevent the reversal of a power window motor independently of the tooth profiles of a worm and a worm wheel, thereby to remarkably enhance the efficiency of the lead angle of the worm.

DESCRIPTION OF THE PREFERRED EMBODIMENT

Figure 1:
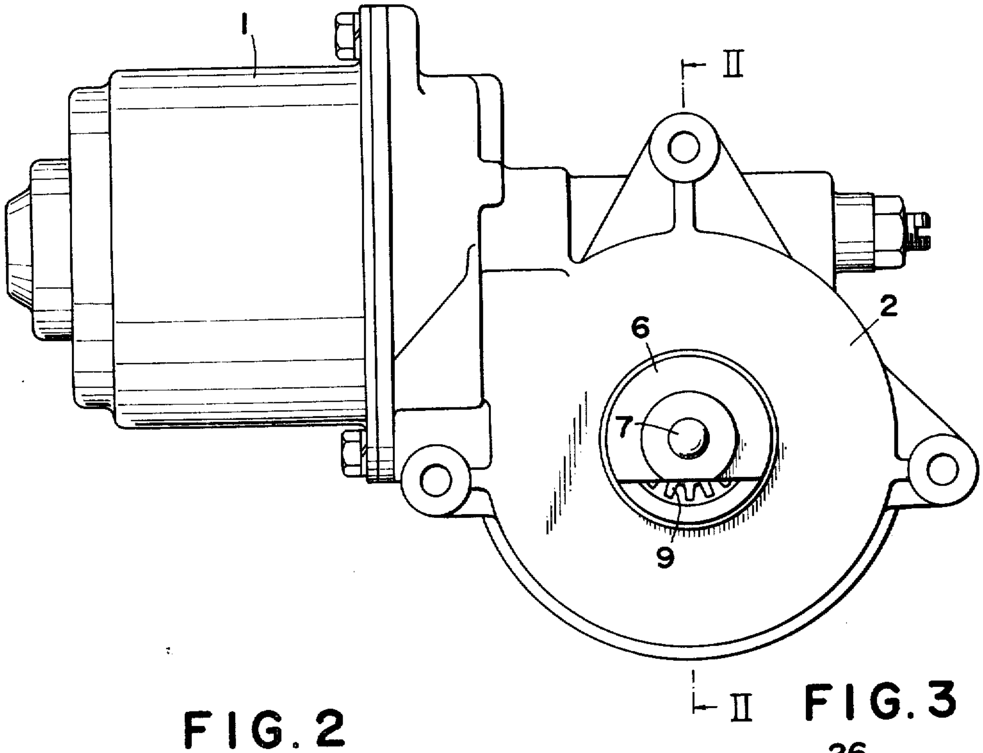
FIG. 1 is a front view of a reversal preventing device for a power window motor according to the present invention.

On the side of the stator 1 of a power window motor, a gear housing 2 is fixed. A casing 3 having a drum 4 is integrally secured to the gear housing 2. At the central part of the drum 4 and at the part of the gear housing 2 having the same center line, bearings 5 and 6 are respectively provided. A shaft 7 is fixedly supported in the bearings 5 and 6. At the outer periphery of the shaft 7, a rotary shaft 8 is rotatingly fitted and supported.

The rotary shaft 8 is provided at the end part on the bearing 6 side with a pinion 9 adapted to mesh with the sector gear 9A of a door window regulator, and is formed at the end part on the bearing 5 side with splines 10. The splines 10 fit with spline grooves 23 which are formed in the inside of an output piece 21 to be described later.

A worm 11 drivingly coupled with the rotor of the power window motor, not shown, is extended into the gear housing 2. A worm wheel 12 rotatingly fitted with the rotary shaft 8 meshes with the worm 11.

The worm wheel 12 is formed with a double cylinder portion 13 on the end face on the drum 4 side. The interior of the double cylinder portion 13 is divided into small compartments 131, by partition plates 130. In the respective small compartments 131, buffer members 14 are closely fitted which are molded of a material having elasticity, such as rubber. A core 16 is engagedly fastened to the buffer members 14.

The core 16 has a flange portion 17 which faces commonly to the shock absorbing members 14, and a cylinder portion 18 which is provided in a manner to be joined with the flange portion 17. At the outer periphery of the cylinder portion 18, there is a cut-away portion 19 which is formed by cutting away the range of a central angle of $\gamma$. The core 16 is rotatingly fitted with the rotary shaft 18, and engagedly fastened to the buffer members 14. It is drivingly coupled with the worm wheel 12 through the buffer members 14.

Figure 2:
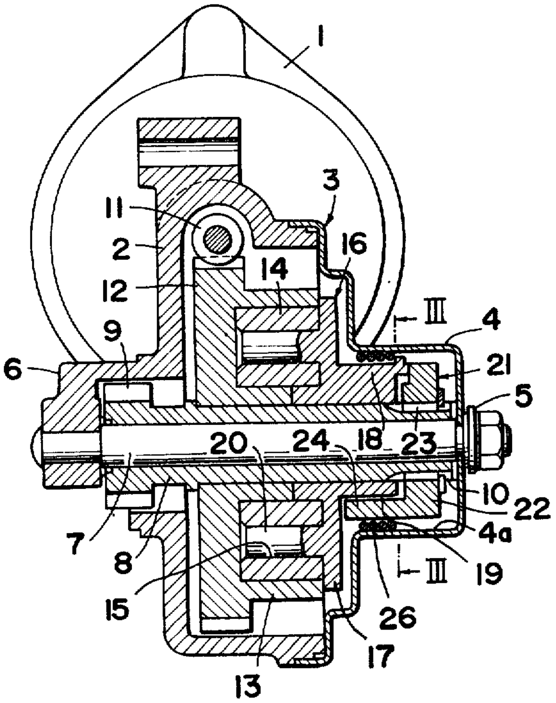
FIG. 2 is a sectional view taken along a line II—II in FIG. 1.
Figure 4:
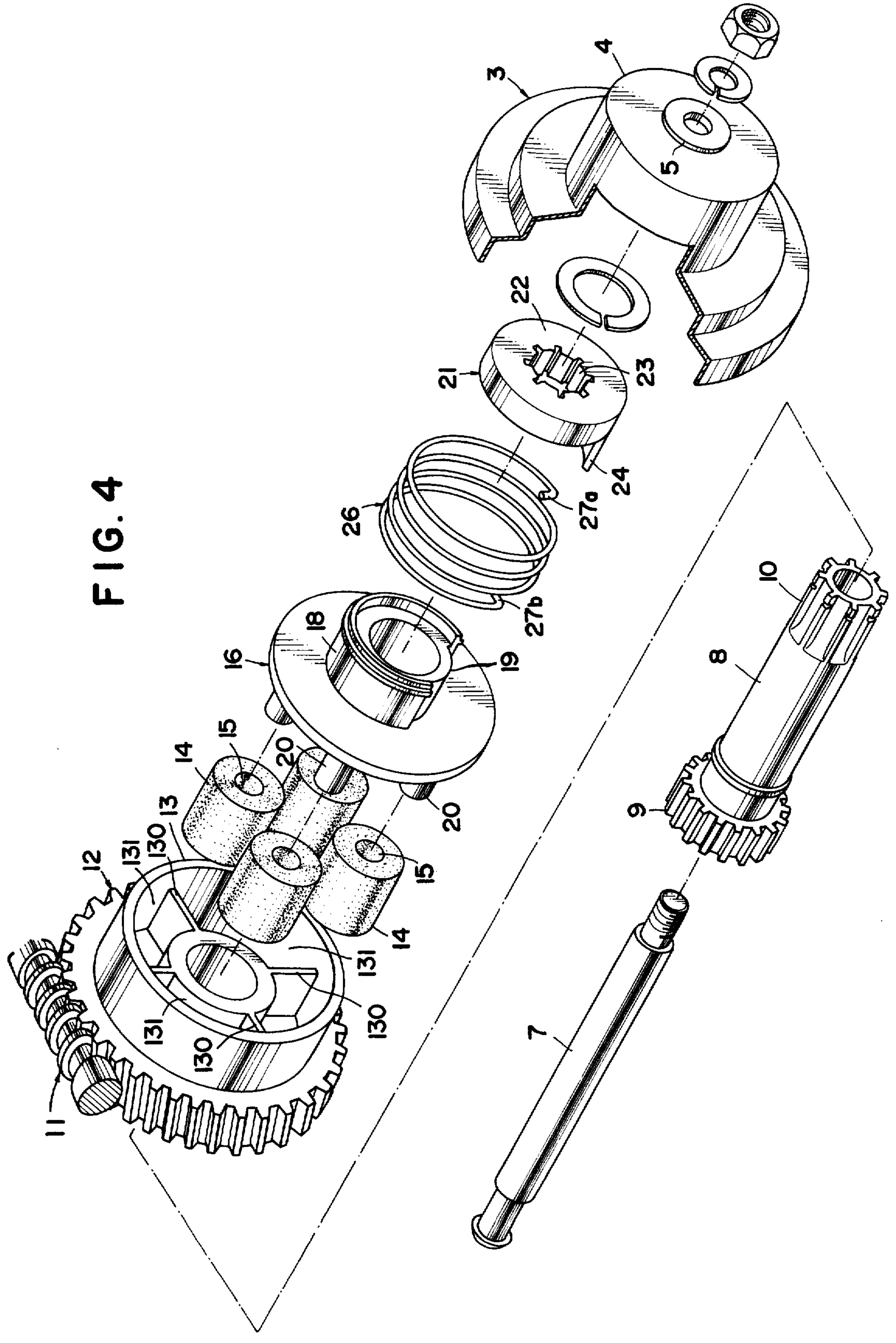
FIG. 4 is an exploded perspective view of the essential portions of the present invention.

In the embodiment shown in FIGS. 2 and 4, the engaged fastening between the buffer members 14 and the core 16 is performed through the fitting between inserting holes 15 formed in the respective buffer members 14 and pins 20 provided on the flange portion 17 of the core 16.

On the outer peripheral surface of the cylinder portion 18 of the core 16, a coiled spring 26 is loosely fitted. The output piece 21 is coupled with the core 16.

The output piece 21 has a boss 22 which has the spline grooves 23 in the inner part, and a dog 24 which is formed on an end face of the boss 22. The dog 24 is shaped at a central angle $\delta$ smaller than the central angle $\gamma$ of the out-away portion 19 of the core 16 so that it can be inserted into the cut-away portion 19. The output piece 21 is coupled with the rotary shaft 8 through the fitting between the spline grooves 23 and the splines 10 of the rotary shaft 8. Further, clearances **25*a* and 25*b* for receiving the bent portions 27*a* and 27*b* of the coiled spring 26 to be described later are defined between the end faces of the cut-away portion 19 of the core 16 and the end faces of the dog 24 of the output piece 21**, the dog being inserted into the cut-away portion.

Figure 3:
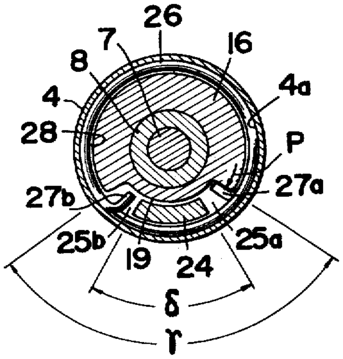
FIG. 3 is a sectional view taken along a line III—III in FIG. 2.

As shown in FIGS. 2 and 3, the coiled spring 26 is disposed in the drum 4 in a state wherein its outer peripheral part is normally held in contact with the inner peripheral surface **4*a* of the drum 4 at some extent of frictional force. In addition, a peripheral clearance 28 is defined between the inner peripheral part of the coiled spring 26 and the outer peripheral surface of the core 18. As seen in FIGS. 3 and 4, the coiled spring 26 is provided with the bent portions 27*a* and 27*b* which are formed by bending both the end parts radially inwards. The bent portions 27*a* and 27*b* are respectively placed in the clearances 25*a* and 25*b*. Through the bent portions 27*a* and 27*b*, the coiled spring 26 is engaged with the core 16 and the output piece 21**.

The drum 4, the core 16, the output piece 21 and the coiled spring 26 constitute a reversal preventing device which, when a turning force in the reverse direction is received from the window glass side, prevents the reversal of the motor attributed to the turning force.

The reversal preventing device of the above construction operates in association with the power window motor as will be stated below.

At the normal rotation of the power window motor, that is, when the power window motor is started for the opening or closing operation of window glass, a turning force is transmitted along the rotor — the worm 11 — the worm wheel 12. Therewith, the rotation has the speed reduced by the worm gearing 11 and 12, and the turning force is transmitted through the buffer members 14 to the core 16.

At this time, the core 16 pushes the bent portion 27*a* or 27*b* of the coiled spring 26 by one end face or the other end face of the cut-away portion 19 thereof, the spring being contacted with the inner peripheral surface 4*a* of the drum at some extent of frictional force. As shown in FIG. 3, the core 16 thus turns the coiled spring 26 at a turning force (P) so as to roll it in. The diameter of the coiled spring 26 is therefore reduced, so that the frictional force between the outer peripheral part of the coiled spring 26 and the inner peripheral surface 4*a* of the drum 4 is lessened. The core 16 initiates rotation smoothly.

As a result, the dog 24 of the output piece 21 as is inserted in the cut-away portion 19 of the core 16 is pushed. Then, the output piece 21 is rotated. The rotation is transmitted along the rotary shaft 8 — the output pinion 9 — the sector gear of the door window regulator. The window glass is opened or closed.

Figure 5:
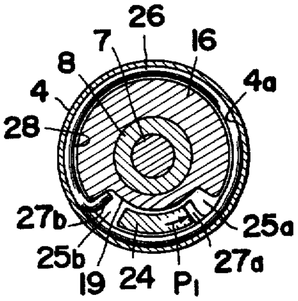
FIG. 5 is a view similar to FIG. 3, for explaining the operation of the present invention.

At the reversal of the power window motor, that is, when the power window motor is going to be rotated by directly pushing down or pulling up the window glass, a turning force is transmitted along the output pinion 9 — the rotary shaft 8 — the output piece 21. As shown in FIG. 5, one end face or the other end face of the dog 24 of the output piece 21 pushes the bent portions 27*a* or 27*b* of the coiled spring 26 at a turning force (P1).

In consequence, the coiled spring 26 has its diameter enlarged and has its outer peripheral part strongly pressed and contacted by the inner peripheral surface 4*a* of the drum 4. Accordingly, the frictional force is increased, and the turning of the dog 24 is checked. For this reason, the output piece 21 is braked. No turning force is transmitted to the core 16, the worm gearing 11 and 12 and the rotor, and the rotation of these rotary members in the reverse direction is prevented.

Whether the output pinion 9 receives a clockwise or anticlockwise turning force from the window glass side, the reversal preventing action is similarly effected.

What is claimed is:

1. A device for driving a power window comprising:

a motor, a gear housing which is fixed to a stator of said motor having an open side, a casing having a drum shaped portion for covering said open side of said gear housing;

a fixed shaft penetrating through a central portion of said gear housing and said casing for securing said casing to said gear housing and a rotary shaft rotatably fitted on an outer periphery of said fixed shaft and which has splines at one end and an output pinion at the other end;

a worm gear driven by said motor which extends into said gear housing;

a worm wheel rotatably fitted on the outer periphery of said rotary shaft near the output pinion end thereof and which meshes with said worm;

said worm wheel having a first cylinder portion at an inner side wall along the periphery of said rotary shaft and a second cylinder portion spaced radially away from said first cylinder portion, the space between said first and second cylinder portions being divided into a plurality of small compartments by partition plates;

buffer members which are closely fitted in said small compartments, each of which has an inserting hole and which are made of an elastic material, a core which is held in close contact with said first cylinder portion and which is rotatably fitted on said outer periphery of said rotary shaft;

pins provided at one side wall of said core and which are snugly inserted in said inserting holes of said buffer members;

a third cylinder portion which is provided at the other side wall of said core along the periphery of said rotary shaft;

a cut-away portion which is formed in a part of said third cylinder portion;

a coil spring which is loosely fitted on the outer periphery of said third cylinder portion and having bent portions at the ends thereof for retaining said end parts in said cut-away portion;

an output piece fitted in said spline of said rotary shaft adjacent said third cylinder portion; and a dog which is formed at a peripheral edge end of one side wall of said output piece in a manner to be slightly less wide than said cut-away portion;

said output piece being coupled to said core by insertion of said dog between both the ends of said coiled spring in said cut-away portion, an inner peripheral surface of said drum portion and an outer peripheral surface of said coiled spring being normally held in frictional contact, rotational motion of said worm wheel being conveyed to said core via said buffer members and causing frictional engagement of said coiled spring with said inner peripheral surface of said drum portion to inhibit rotation by expansion of the diameter of said coil spring for one direction of rotation, and causing a decrease in the diameter of said coiled spring for the other direction of rotation for allowing rotation of said core, rotation of said core causing engagement of said core with said dog at said cut away section and causing rotation of said output piece and the output pinion gear of said rotary shaft.

2. The reversal preventing device for a power window motor according to claim 1, wherein splines formed at an end of said rotary shaft are fitted with spline grooves formed inside a central part of said output piece.

3. The reversal preventing device for a power window motor according to claim 1, wherein said worm wheel has a double cylinder portion, the interior of said double cylinder portion being divided into small compartments by partition plates, and wherein said buffer members are formed of an elastic material such as rubber, said members being closely fitted in respective small compartments.

4. An apparatus for transmitting motive power for raising and lowering a window comprising:

a housing adapted to be attached to a motor, a drum shaped cover fitted to said housing, a fixed shaft secured within said housing for securing said cover to said housing, a rotatable shaft rotatably and concentrically disposed about said fixed shaft, said rotatable shaft having a pinion gear at one end thereof for motive power output and a plurality of splines at the other end thereof, a gear wheel rotatably and concentrically disposed about said rotatable shaft adapted to receive motive power from a motor, a core rotatably and concentrically fitted to said rotatable shaft and having a cylindrical portion, said cylindrical portion having a cut away radial section, buffer means resiliently coupling said gear wheel and said core, a coil spring concentric with said cylindrical portion fitted between said cylindrical portion and the inner surface of said drum shaped cover, said coil spring being bent at the ends thereof, said bent ends being fitted in and engageable with the cylindrical portion in said cut away section, and an output piece engageably fitted with the splines on the end of said rotatable shaft and having a dog inserted in said cut away section between the bent ends of said coil spring, rotational motion of said gear wheel being conveyed to said core via said buffer means and causing frictional engagement of said coil spring with said inner surface of said cover to inhibit rotation by expansion of the diameter of said coil spring for one direction of rotation, and causing a decrease in the diameter of said coil spring for the other direction of rotation for allowing rotation of said core, rotation of said core causing engagement of said core with said dog at said cut away section and causing rotation of said output piece and the pinion gear of said rotatable shaft.

* * * * *